United States Patent Office 3,494,894
Patented Feb. 10, 1970

3,494,894
PROCESS FOR PRODUCING ELASTIC FIBERS FROM POLYURETHAN POLYMERS HAVING A CROSSLINKED STRUCTURE
Federico Urgesi, 21 Via Leonardo da Vinci, Vercelli, Italy
No Drawing. Filed Aug. 1, 1967, Ser. No. 657,536
Claims priority, application Italy, Aug. 20, 1966, 19,203/66
Int. Cl. C08g 22/04, 22/18
U.S. Cl. 260—75      10 claims

ABSTRACT OF THE DISCLOSURE

Elastic fibers are prepared from crosslinked polyurethan polymers which are soluble in suitable organic solvents. The crosslinking of said polyurethan polymers being obtained by the reaction of a linear polyurethan polymer in solution with a high molecular weight diisocyanate or mixtures of diisocyanates having different molecular weights, wherein the constituents having a molecular weight higher than 500 are not less than 70% by weight of the total.

---

The present invention relates to the production of elastic fibers from crosslinked structure polyurethan polymers.

The preparation of elastic fibers from diols and diisocyanates is well known. Normally an elastic fiber is prepared by reacting a diol of the general formula HO—R—OH and having a molecular weight in the range from 600 to 5000 with a diisocyanate of the general formula OCN—R'—NCO.

The diol can be a polyether, obtained by the polymerization of cyclic ethers or a polyester obtained from one or more dicarboxylic acids with aliphatic glycols.

The diisocyanate can be aliphatic, aromatic or cycloaliphatic. Generally aromatic diisocyanates are preferred.

A prepolymer is first formed with an excess of diisocyanate, which prepolymer is then diluted with suitable solvents and reacted with stoichiometric amounts, with respect to the free —NCO groups, of a chain extender such as hydrazine, sym-dialkyl hydrazines, primary or secondary aliphatic and aromatic diamines, aminoalcohols, glycols or dihydrazides.

The polymers thus obtained have a substantially linear structure and such a structure is generally deemed necessary to permit the dissolution in solvents suitable for the subsequent processing.

It has now been found that it is possible to prepare polymers having a crosslinked structure thoroughly soluble in the usual solvents of polyurethans and that such a crosslinking can be controlled within wide limits depending on the particular characteristics desired in the final polymer.

The crosslinking is obtained by reacting a linear polymer in solution with a high molecular weight diisocyanate. The crosslinking occurs therefore through the formation of biuret linkages and partially also with formation of allophanate linkages.

The biuret linkage is predominating owing to the higher reaction rate of the isocyanate group with the urea group in comparison with the urethan group.

Diols which can be used in carrying out the present invention include for example aliphatic polyesters, polyester amides, polyalkylene glycols, polycarbonates and polyacetals having a linear structure.

These compounds have generally a molecular weight in the range from 600 to 5000 and a melting point lower than 140° F. (60.0° C.) preferably lower than 122.0° F. (50.0° C.).

The polyesters are obtained from glycols, amino alcohols, hydroxy-carboxylic acids, amino-carboxylic acids, lactones, dicarboxylic acids.

It will be possible for example to use polyesters prepared from adipic acid with ethylene glycol, butanediol, pentanediol, hexanediol, mixtures of ethylene glycol and 1,2-propylene glycol, 1,4-cyclohexanediol, 1,4-dihydroxymethylcyclohexane, aminoalcohols such as amino-ethanol and amino-propanol; polyesters derived from lactones such as caprolactone, methylcaprolactone, butyrolactone.

In place of the adipic acid other dicarboxylic acid can be used such as for example glutaric, pimelic, methyladipic, succinic, sebacic acids or cycloaliphatic acids such as 1,4-cyclohexanedicarboxylic acid.

Of the hydroxy-terminated polyethers use can be made of those obtained from ethylene, propylene oxide or from tetrahydrofuran.

Furthermore, use can be made of mixtures of aliphatic polyesters or polyethers with low molecular weight diols containing aromatic nuclei such as for example those having the general formulas:

or

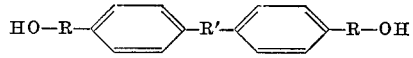

wherein R and R' represent aliphatic chains —$(CH_2)_n$— with $n$ being in the range from 0 to 5 or aliphatic chains containing hetero-atoms. The proportion of these aromatic compounds which can be used can range from 5 to 25% by weight based on the aliphatic diol. In case use is made of the above mentioned mixtures, an aliphatic diisocyanate can be advantageously used obtaining polymers having a good light stability.

Use can be made of any aromatic, aryl-aliphatic, aliphatic or cycloaliphatic diisocyanates as for example: 2,4- and 2,6-toluene diisocyanate; diphenyl-4,4'-diisocyanate; diphenylmethane-4,4'-diisocyanate; dibenzyl-4,4'-diisocyanate; naphthalene diisocyanate; 3,3'-dichlorodiphenylmethane-4-4'-diisocyanate; 1,4-xylylene diisocyanate, tetramethylene diisocyanate; hexamethylene diisocyanate; 1,4-cyclohexane diisocyanate; 4,4'-dicyclohexylmethane-diisocyanate.

According to the present invention the preparation of the polymers occurs through the following steps:

(a) Preparation of the prepolymer by reaction of the polyhydroxy compounds with the diisocyanates in molar ratios in the range from 1:1.3 to 1:2 so as to obtain a compound having —NCO end groups.

The reaction is carried out in an inert environment and in the pressence or absence of solvents, at temperatures in the range from 122.0° F. (50.0° C.) to 302.0° F. (150.0° C.) depending on the reactivity of the diisocyanate being used.

(b) Reaction of the prepolymer dissolved in a suitable solvent and containing free isocyanate groups with a chain extender in a stoichiometric amount with respect to the free isocyanate groups.

Suitable solvents include highly polar solvents such as for example: dimethylformamide, dimethylacetamide, dimethylsulfoxide, hexamethylphosphoramide, N-methylpyrizolidone.

As chain-extending agent use can be made of primary or secondary aliphatic, aromatic, aryl-aliphatic or cycloaliphatic diamines such as for example hydrazine, symdialkyl hydrazines, ethylene diamine, tetramethylene diamine, hexamethylene diamine, 1,6-dimethyl-hexamethylene diamine, piperazine, 1,3-di-4-piperidylpropane, 1,4-xylylene diamine.

A part of the diamines can be replaced by low molecular weight diols such as the glycols having 2 to 10 carbon atoms, aromatic glycols such as xylylene diol or cycloaliphatic glycols such as cyclohexanedimethanol.

(c) Crosslinking of the polymer in solution by means of a macrodiisocyanate having a high molecular weight in the range from 600 to 6000.

The macrodiisocyanate is obtained by the reaction of a diol of the general formula HO—R—OH and one or more diisocyanates in glycol to diisocyanate molar ratios in the range from 1:1.3 to 1:2.

The diols and diisocyanates which can be used for the preparation of the macrodiisocyanates are the same hereinabove already mentioned for the preparation of the prepolymer.

Together with the macrodiisocyanate there can be also used a low molecular weight diisocyanate provided however that the constituents having a molecular weight higher than 500 are not less than 70% by weight of the total. The crosslinking reaction is carried out under an inert atmosphere by adding to the solution of the linear polymer, and in the presence or absence of suitable catalysts, the crosslinker as such as dissolved in an inert solvent such as tetrahydrofuran, chlorobenzene, dimethylformamide, dimethylsulfoxide.

During the reaction the mass is maintained at a temperature in the range from 23.0° F. (−5° C.) to 302.0° F. (+150° C.) preferably from 59.0° F. (+15° C.) to 122.0° F. (+50° C.) The reaction time depends on the temperature, the presence or absence of catalyst and the type of crosslinking agent. However as the reaction proceeds, the viscosity of the solution increases until to remain constant after the reaction is completed.

From the above it is evident that by suitably selecting the diol and the diisocyanate it is possible to obtain macrodiisocyanates having a predetermined chain length. In addition, by controlling the ratio of polymer to macrodiisocyanate it is possible to obtain a controlled crosslinking both as to number of meshes and as to size of the meshes.

With a wide and thin mesh crosslinking polymers will be obtained having a high elongation and a high permanent stretch. Moreover the yarns obtained, subjected to stretch, will change comparatively little in their physical properties.

With a higher crosslinking there will be obtained lesser elongations, a lesser permanent stretch and a noticeable improvement of the physical properties by subjecting the filaments to a cold and hot stretching action.

It is therefore possible with the polymers of the present invention to control, according to the different applications, the physical properties of the filaments such as tenacity, elongation, modulus, permanent stretch in a simple and thoroughly reproducible way.

As macrodiisocyanate use can be advantageously made of the same prepolymer as it is obtained before the completion of the first step of the preparation of the polymer.

To the solutions of the polymers thus obtained, it will be possible to add pigments such as titanium dioxide, dyes, stabilizers for improving the properties of resistance to light, heat and hydrolysis.

The solutions obtained can be converted into filaments by the known dry or wet spinning methods.

The invention is further illustrated by the following examples which are given solely by way of illustration and which are not to be construed as a limitation of the scope of the invention.

EXAMPLE 1

100 g. of a polyester prepared from adipic acid and ethylene glycol and having a molecular weight of about 2000 are charged into a glass reactor and heated under vacuum at 176.0° F. (80.0° C.). 22.8 g. of molten and filtered 4,4′-diphenylmethane diisocyanate are added and heating is continued, with stirring, for 90 minutes. Then 50 g. of tetrahydrofuran are added and the mass is cooled down to 41.0–42.8° F. (5°–6° C.).

10 g. of the product are withdrawn which are set apart.

To the mass of the prepolymer, dimethylformamide cooled at 32.2° F. (0° C.) is added as to obtain a solids final concentration of about 30% and the chain extension is carried out by the addition of a stoichiometric amount of hydrazine based upon the analytically determined amount of free isocyanate groups.

There occurs an immediate increase in viscosity which within a few minutes reaches a value of about 1000 poises.

To the polymer solution, 10 g. of previously set apart prepolymer are added and mixing is continued. Within 15 minutes there occurs a further increase in viscosity until a value of about 3000 poises is reached.

The polymer solution is diluted at 25% obtaining a viscosity of 1200 poises. To the dope thus obtained, titanium dioxide dispersed in dimethylformamide is added in a ratio of 5% based on the polymer and, after filtration and deaeration, the dope is dryspun in a cell heated at 428.0° F. (220.0° C.). The spinning rate is of 1050 ft./min. (320 m./min.). The yarn is oiled before the taking up with an aqueous emulsion containing Vaseline oil and emulsifiers.

The yarn obtained has the following properties. Relative viscosity in a 50/50 phenol/tetrachloroethane mixture=2.5. Melting point=446.0°–455.0° F. (230°–235° C.).

| | |
|---|---|
| Count/filaments | 100/6 |
| Tenacity _____g./den__ | 1.1 |
| Elongation _____percent__ | 900 |
| Modulus (g./den. at 100% elongation) _____ | 0.04 |
| Permanent stretch (after 6 hours at ¾ of the break elongation) _____percent__ | 6 |

The same yarn stretched at 200% on a plate heated at 194.0° F. (90° C.) and allowed to recover by 100%, has the following properties:

| | |
|---|---|
| Tenacity _____g./den__ | 1.5 |
| Elongation _____percent__ | 750 |
| Permanent stretch _____do____ | 3.5 |
| Modulus _____g./den__ | 0.05 |

EXAMPLE 2

The process of Example 1 is repeated replacing the polyester from adipic acid and glycols by a caprolactam polymer having a molecular weight of 2000.

The results obtained are essentially the same.

EXAMPLE 3

The process of Example 2 is repeated except that the prepolymer used for the crosslinking is increased to 15 g. The yarn obtained has the following properties:

(a) Yarn as spun

| | |
|---|---|
| Tenacity _____g./den__ | 1.15 |
| Elongation _____percent__ | 680 |
| Permanent stretch _____do____ | 4.5 |
| Modulus _____g./den__ | 0.1 |

(b) Stretched yarn

| | |
|---|---|
| Tenacity _____g./den__ | 1.45 |
| Elongation _____percent__ | 520 |
| Permanent stretch _____do____ | 2.7 |
| Modulus _____g./den__ | 0.2 |

EXAMPLE 4

The process of Example 3 is repeated substituting piperazine for the hydrazine. The increase in viscosity is slower than in the preceding example, but is reaches the same values within 40 minutes.

The yarn obtained has the following properties:

(a) Yarn as spun

Tenacity _____ g./den__ 0.98
Elongation _____ percent__ 750
Permanent stretch _____ do____ 4.0
Modulus _____ g./den__ 0.07

(b) Stretched yarn

Tenacity _____ g./den__ 1.20
Elongation _____ percent__ 600
Permanent stretch _____ do____ 3.3
Modulus _____ g./den__ 0.12

EXAMPLE 5

The process of Example 3 is repeated substituting hexamethylene diamine for the hydrazine. The results obtained are essentially the same.

EXAMPLE 6

The process of Example 3 is repeated substituting p-xylylene diamine for the hydrazine. The increase in viscosity is slower and is completed in about 60 minutes.

The yarn obtained has the following properties. Melting point: 473.0° F. (245° C.).

(a) Yarn as spun

Tenacity _____ g./den__ 1.07
Elongation _____ percent__ 700
Modulus _____ g./den__ 0.1
Permanent stretch _____ percent__ 3.9

(b) Stretched yarn

Tenacity _____ g./den__ 1.20
Elongation _____ percent__ 550
Modulus _____ g./den__ 0.17
Permanent stretch _____ percent__ 2.8

EXAMPLE 7

Example 3 is repeated except that 1,3-di-4-piperidyl-propane is substituted for the hydrazine. The increase in viscosity is very fast and the solution obtained is slightly turbid. After crosslinking the solution is maintained during the subsequent filtration and deaeration steps, at a temperature of about 122.0° F. (50° C.) at which the solution appears clear.

The yarn obtained has the following properties:

(a) Yarn as spun

Tenacity _____ g./den__ 0.95
Elongation _____ percent__ 780
Permanent stretch _____ do____ 5.5
Modulus _____ g./den__ 0.12

(b) Stretched yarn

Tenacity _____ g./den__ 1.14
Elongation _____ percent__ 610
Permanent stretch _____ do____ 3.0
Modulus _____ g./den__ 0.16

EXAMPLES 8–10

The preparation of the prepolymer is carried out according to Example 3.

On the contrary the chain extension is carried out by the addition of diamines and diols.

In any case, first the 60 % of the theory of hydrazine is added and, after mixing for 15 minutes, the extension is completed by the addition of the the theoretical amount of diol.

After the addition the mass is progressively heated to 140.0° F. (60° C.) and is maintained thereat and under stirring until the viscosity is constant. The mass is then cooled and thereafter the crosslinking is carried out as described in Example 3.

The diols used for the chain extension include: butanediol, cyclohexanedimethanol; 1,3-di-(N-β-hydroxyethyl-4-piperidyl) propane.

The yarn obtained has the following properties:

|  | Ex. 8 | Ex. 9 | Ex. 10 |
|---|---|---|---|
|  | Diol used | | |
|  | Butane diol | Cyclohexanedimethanol | 1,3-di-(N-β-hydroxyethyl-4-piperidyl) propane |
| Melting point: | | | |
| ° F_____ | 446.0 | 491.0 | 482.0 |
| ° C_____ | 230 | 255 | 250 |
| (a) Yarn as spun: | | | |
| Tenacity, g./den_____ | 0.96 | 1.12 | 1.10 |
| Elongation, percent_____ | 820 | 750 | 900 |
| Permanent stretch, percent___ | 5.1 | 4.6 | 6.5 |
| Modulus, g./den_____ | 0.09 | 0.15 | 0.12 |
| (b) Stretched yarn: | | | |
| Tenacity, g./den_____ | 1.21 | 1.27 | 1.25 |
| Elongation, percent_____ | 710 | 650 | 700 |
| Permanent stretch, percent___ | 44.0 | 3.1 | 4.5 |
| Modulus, g./den_____ | 0.15 | 0.17 | 0.15 |

EXAMPLE 11

By the same procedures as in Example 2, a polymer having an increased crosslinking is prepared by using to this end 25 g. of prepolymer. In order to maintain the viscosity of the solution at a value of about 1500 poises the concentration is brought to 22%.

The yarn obtained has the following properties:

Tenacity _____ g./den__ 1.2
Elongation _____ percent__ 620
Permanent stretch _____ do____ 1.8
Modulus _____ g./den__ 0.30

After stretching the properties are:

Tenacity _____ g./den__ 1.5
Elongation _____ percent__ 450
Permanent stretch _____ do____ 1.8
Modulus _____ g./den__ 0.30

EXAMPLE 12

100 g. of a polytetramethyleneglycol, prepared by polymerisation of tetrahydrofuran and having a molecular weight of 1820 are charged in a reactor and heated at 158.0° F. (70° C.). Then 25.5 g. of molten and filtered 4,4′-diphenylmethane diisocyanate are added and heating is continued, with stirring for 110 minutes.

Thereafter 60 g. of tetrahydrofuran are added and the reaction mixture is cooled down to about 41.0° F. (5° C.).

About 15 g. of the prepolymer thus obtained are set apart.

To the balance of the prepolymer, diluted at 30% with cold dimethylformamide there is added with stirring a stoichiometric amount of hydrazine based upon the analytically determined amount of free —NCO groups.

After the increase in viscosity the 15 g. of prepolymer prevously set apart are added and mixing is continued until completion of the reaction.

Thereafter the mixture is diluted so as to bring the final viscosity at about 1000 poises and then the procedure as described in Example 1 is followed.

The yarn obtained has the following properties: Melting point=473.0–478° F. (245°–248° C.).

(a) Yarn as spun

Tenacity _____ g./den__ 1.05
Elongation _____ percent__ 850
Permanent stretch _____ do____ 5.4
Modulus _____ g./den__ 0.09

(b) Stretched yarn

Tenacity _____ g./den__ 1.15
Elongation _____ percent__ 700
Permanent stretch _____ do____ 3.1
Modulus _____ g./den__ 0.16

EXAMPLE 13

A polymer prepared according to Example 1 is further crosslinked by the addition of 1.5 g. of hexamethylene diisocyanate. After this addition the temperature of the mass is brought at 158.0° F. (70° C.) and maintained thereat for 40 minutes. At the end of this time the viscosity of the mass has undergone an increase from 1100 to 1600 poises. The material is diluted to a concentration of 22% and is dry spun under the conditions of Example 1.

The properties of the yarn obtained are the following:

(a) Yarn as spun

| | | |
|---|---|---|
| Tenacity | g./den | 1.02 |
| Elongation | percent | 520 |
| Permanent stretch | do | 3.8 |
| Modulus | g./den | 0.15 |

(b) Stretched yarn

| | | |
|---|---|---|
| Tenacity | g./den | 1.25 |
| Elongation | percent | 460 |
| Permanent stretch | do | 2.9 |
| Modulus | g./den | 0.22 |

EXAMPLE 14

100 g. of polycaprolactone having a molecular weight of 2000 and 18 g. of p-xylylenediol are charged in a glass reactor provided with stirrer, reflux condenser and inert gas inlet tube.

The temperature is brought to 212° F. (100° C.) and the whole is stirred for 30 minutes to homogenize the mass. Then, 37.8 g. of hexamethylenediisocyanate are added and heating and stirring is continued for two hours.

60 g. of tetrahydrofurane are then added and the mass is cooled down to 50.0° F. (10° C.) after which it is diluted with dimethylformamide cooled at 32.0° F. (0° C.) until a solids final concentration of 30% is obtained.

After titration of the free isocyanate groups, the theoretical amount of hyrazine for the chain extension is added. The increase in viscosity is fast and within 10 minutes a value of about 800 poises is reached.

To the polymer solution thus obtained, 18 g. of a prepolymer prepared from polycaprolactone and 4,4'-diphenylmethane diisocyanate as described in Example 2 are added. The viscosity of the solution increases within 30 minutes to a value of 2200 poises. The material is diluted with dimethylformamide to a final concentration of 26% corresponding to a viscosity of about 1000 poises.

The subsequent steps are carried out as described in Example 1.

The properties of the yarn are the following: Melting point: 496.0° F. (258.0° C.).

(a) Yarn as spun

| | | |
|---|---|---|
| Tenacity | g./den | 0.90 |
| Elongation | percent | 720 |
| Permanent stretch | do | 6.8 |
| Modulus | g./den | 0.10 |

(b) Stretched yarn

| | | |
|---|---|---|
| Tenacity | g./den | 1.15 |
| Elongation | percent | 650 |
| Permanent stretch | do | 4.0 |
| Modulus | g./den | 0.15 |

Having thus described the present invention, what is claimed is:

1. In a process for the preparation of spinnable organic solvent-soluble polyurethane polymers wherein a prepolymer is first formed by reaction of a hydroxyl-terminated bifunctional polyol having a molecular weight of 600–5000 and a melting point below 60° C., with an excess of aliphatic diisocyanate, aromatic diisocyanate or cycloaliphatic diisocyanate, and the resultant prepolymer is then reacted in organic solvent medium with a stoichiometric amount, with respect to the free —NCO groups contained in the prepolymer, of chain extender selected from the group consisting of primary amines, secondary amines, and mixtures thereof with low molecular weight diols, the improvement according to which the resultant linear polyurethanepolymer is cross-linked by reaction thereof in solution with a member selected from the group consisting of macro-diisocyanate having a molecular weight above 500 and of mixtures of macro-diisocyanate with diisocyanates of lower molecular weights wherein not less than 70% by weight of the mixture is constituted by macro-diisocyanate.

2. In a process as defined in claim 1, wherein the bifunctional polyol is diol, the improvement according to claim 1.

3. In a process as defined in claim 1, wherein the bifunctional polyol is aliphatic polyester, the improvement according to claim 1.

4. In a process as defined in claim 1, wherein the bifunctional polyol is polyalkylenediol, the improvement according to claim 1.

5. In a process as defined in claim 1, wherein the bifunctional polyol is polycaprolactone, the improvement according to claim 1.

6. In a process as defined in claim 1, wherein the bifunctional polyol is admixed with up to 25% by weight of low molecular weight glycol containing aromatic nuclei, the improvement according to claim 1.

7. An improvement according to claim 1, wherein the cross-linker is the same macro-diisocyanate as that utilized in the making of the prepolymer from bifunctional polyol and diisocyanate, said macro-diisocyanate being the product of the reaction of diol with one or more diisocyanates in diol to diisocyanate molar ratios in the range from 1:1.3 to 1:2, at 50 to 150° C.

8. An improvement according to claim 1 wherein the macro-diisocyanate has a molecular weight of 600 to 6000.

9. A cross-linked polymer which is the reaction product of polyurethanepolymer containing urea groups with macro-diisocyanate or a mixture of diisocyanates of which not less than 70% by weight is macro-diisocyanate of molecular weight from 600 to 6000, said polyurethane polymer being the reaction product of a hydroxyl-terminated bifunctional polyol, with a molecular weight of 600–5000 and a melting point below 60° C., with diisocynate and with a chain extender selected from the group consisting of primary amines, secondary amines, and mixtures thereof with low molecular weight diols.

10. Elastic fibers constituted by the polymer according to claim 9.

References Cited

UNITED STATES PATENTS

| | | | |
|---|---|---|---|
| 2,929,800 | 3/1960 | Hill | 260—77.5 |
| 2,957,852 | 10/1960 | Frankenburg et al. | 260—75 |
| 2,999,839 | 9/1961 | Arvidson et al. | 260—45.9 |
| 3,009,901 | 11/1961 | Frazer | 260—47 |
| 3,099,642 | 7/1963 | Holtschmidt et al. | 260—75 |

OTHER REFERENCES

Saunders et al.: Polyurethanes vol. I, pp. 194—197. Interscience, New York (1962).

DONALD E. CZAJA, Primary Examiner

H. S. COCKERAM, Assistant Examiner

U.S. Cl. X.R.

260—77.5, 67, 78